United States Patent [19]
Scott et al.

[11] Patent Number: 5,785,927
[45] Date of Patent: Jul. 28, 1998

[54] VESSEL HANDLING SYSTEM USEFUL FOR COMBINATORIAL CHEMISTRY

[75] Inventors: William L. Scott, Indianapolis; Robert A. Schonegg, Greenwood; Cynthia L. Cwi, Indianapolis, all of Ind.

[73] Assignee: Eli Lilly and Company, Indianapolis, Ind.

[21] Appl. No.: 738,971

[22] Filed: Oct. 24, 1996

[51] Int. Cl.$^6$ .................................................. B01L 9/06
[52] U.S. Cl. .................... 422/104; 422/63; 422/100; 422/101; 422/102; 422/103; 210/323.2; 210/513
[58] Field of Search ................... 422/63, 99, 100, 422/101, 102, 104; 210/323.2, 335, 513

[56] References Cited

U.S. PATENT DOCUMENTS

| | | | |
|---|---|---|---|
| 4,948,564 | 8/1990 | Root et al. | 422/101 |
| 4,970,165 | 11/1990 | Uhrin | 435/287 |
| 5,035,866 | 7/1991 | Wannlund | 422/102 |
| 5,110,556 | 5/1992 | Lyman et al. | 422/101 |
| 5,417,923 | 5/1995 | Bojanic et al. | 422/101 |
| 5,456,360 | 10/1995 | Griffin | 206/443 |
| 5,601,711 | 2/1997 | Sklar et al. | 210/238 |

OTHER PUBLICATIONS

"Multiblock—Manual Multiple Peptide/Nonpeptide/Library Synthesizer" brochure distributed by Peptides International, Inc. of Louisville, Kentucky.

*Primary Examiner*—Harold Y. Pyon
*Attorney, Agent, or Firm*—Baker & Daniels

[57] ABSTRACT

A system for holding laboratory or reaction vessels useful for performing combinatorial chemistry, particularly parallel array synthesis. The system includes a holder having O-ring lined apertures which retain reaction vessels inserted therein. The vessels each have an internal filter dividing the vessel interior volume into first and second chambers that are sealed and unsealed with separately operable caps. The system also includes a collection rack having vessel guides adapted to accommodate collection vessels used to collect materials within the reaction vessels. The vessel guides are arranged on the collection rack in the same pattern as the apertures are arranged on the holder such that the vessel guides align with the holder apertures when the collection rack and the holder are positioned in a stacked relationship. The system also includes a drain tray for convenient emptying of reaction vessels retained on the holder, and a machine for rotating the holder to rotate vessels retained on the holder.

19 Claims, 3 Drawing Sheets

VESSEL HANDLING SYSTEM USEFUL FOR COMBINATORIAL CHEMISTRY

BACKGROUND OF THE INVENTION

The present invention pertains to equipment for laboratory use, and, in particular, to an equipment system used to facilitate the handling of multiple reaction vessels and the collection of materials processed within the reaction vessels.

In industries such as the pharmaceutical industry, compounds are frequently synthesized for testing purposes. One technique for accomplishing the synthesis involves subjecting a resin-bound starting molecule to a series of reagent chemicals that react with the starting molecule in such a manner to achieve the desired synthesized compound. A description of this technique is provided in "Solid Phase Synthesis", by J. M. Stewart and J. D. Young, second edition (ISBN #0-935940-03-0, copyright 1984), published by Pierce Chemical Company of Rockford, Ill., which is incorporated herein by reference.

Manually handling reaction vessels during this process is cumbersome and labor intensive, especially when large lots of compounds are being created simultaneously. To address this problem, various articles of sophisticated laboratory equipment have been developed. For example, commercial solid phase synthesizers (e.g., The Advanced ChemTech Model 396 synthesizer) can perform simultaneous reactions in up to ninety-six separate polypropylene wells. However, the relatively high cost of such equipment typically precludes smaller, individual laboratories from obtaining these synthesizers as standard equipment. Even larger laboratories faced with projects of modest proportion may find such equipment to be cumbersome and/or unnecessary for many routine uses.

Another synthesizer known as the Multiblock, which is available from Peptides International, Inc. of Louisville, Ky., allows chemists or users to synthesize forty-two samples simultaneously. While more affordable than many prior art synthesizers, the Multiblock may still be too expensive for some laboratories. Other shortcomings of the Multiblock result from the fact that assemblies known as multistoppers are typically used to seal all of the reaction vessels during the reaction process. Besides being constructed of component parts which may require repair or maintenance over time, these multistoppers require all of the reaction vessels to be unsealed when an operator wishes to unseal the multistopper and remove only a single reaction vessel held within the Multiblock synthesizer. Still further, the Multiblock's use of a bulky set of plates attachable with spanning shafts results in a somewhat cumbersome and inflexible design.

Thus, it would be desirable to provide a vessel handling system which overcomes these and other problems of the prior art.

SUMMARY OF THE INVENTION

The present invention provides a relatively simple and inexpensive apparatus for use in performing laboratory processes. In particular, the apparatus of the invention is useful for performing combinatorial chemistry, especially when solid-bound substrates, reagents or scavengers are employed. Most preferred is the use of the apparatus of the invention for parallel array synthesis. The vessel holder system of the present invention provides a convenient holder for multiple reaction vessels with internal frits which are individually capped to allow each vessel to be independently sealed and unsealed. The system also includes a collection rack for collecting in an orderly fashion the substances within the reaction vessels, and a drain tray for facilitating emptying of the reaction vessels.

In one form thereof, the present invention provides a vessel handling system including a vessel holder having a body through which extend a plurality of apertures, wherein the plurality of apertures is located on the body in a first arrangement, and a plurality of vessels each including a filter dividing the vessel's interior volume into a first chamber and a second chamber. Each of the vessels also includes a first port in communication with its first chamber, a second port in communication with its second chamber, a first stop member for selectively sealing and unsealing the first port, and a second stop member for selectively sealing and unsealing the second port. The vessel holder and the vessels are cooperatively configured such that the vessel holder holds each of the vessels inserted into one of the plurality of body apertures. The first stop member of a first vessel is separately operable from the first stop member of a second vessel, whereby the first vessel first port may by sealed and unsealed while the second vessel first port remains unsealed and sealed respectively. The second stop member of the first vessel is separately operable from the second stop member of the second vessel, whereby the first vessel second port may by sealed and unsealed while the second vessel second port remains unsealed and sealed respectively.

In another form thereof, the present invention provides a vessel handling system including at least two vessels, a holder, at least two collection containers, and a collection rack. Each of the at least two vessels includes an interior volume and a filter dividing the interior volume into a first chamber and a second chamber. Each of the at least two vessels also includes a first closable port in communication with the first chamber and a second closable port in communication with the second chamber. The holder includes a body through which extend a plurality of apertures, and the plurality of apertures are located on the body in a first arrangement. The holder and the at least two vessels are complementarily sized and shaped such that the holder holds each of the at least two vessels inserted into one of the plurality of body apertures. The collection rack includes a plurality of container guides, each of the container guides adapted to accommodate one of the collection containers. The container guides are arranged in the first arrangement, whereby the plurality of container guides are aligned with the plurality of apertures when the collection rack and the holder are positioned in a first stacked relationship. The holder body also includes a surface with a plurality of recesses, wherein one of the plurality of recesses rings each of the plurality of apertures and is sized and shaped to accommodate a mouth of one of the at least two collection containers.

In still another form thereof, the present invention provides a vessel handling system including a plurality of vessels each having an interior volume and a filter dividing the interior volume into a first chamber and a second chamber, each of the plurality of vessels further comprising a first port in communication with the first chamber and a second port in communication with the second chamber. The system also includes means for removably holding the plurality of vessels, and means for selectively sealing the first and second ports of the plurality of vessels such that after all of the first and second ports of the plurality of vessels held by the holding means are sealed, one of the plurality of vessels may be removed from the holding means while the first and second ports of the other vessels held by the holding means remained sealed.

One advantage of the present invention is that numerous reaction vessels may be simultaneously handled in a convenient and user friendly fashion during scientific studies.

Another advantage of the vessel holder system of the present invention is that each reaction vessel being handled may be separately sealed and unsealed, thereby allowing certain reaction vessels to be removed from the vessel holder system or provided with additional reactants without affecting the other reaction vessels.

Another advantage of the present invention is that it can be adapted for use with a variety of readily available laboratory equipment.

Still another advantage of the present invention is that it is compatible with many different reaction volumes, the different volumes being simply attained through the use of reaction vessels of varying lengths and widths.

Still another advantage of the present invention is that it provides for an orderly and convenient collection of the contents of individual reaction vessels.

Still another advantage of the present invention is that its simplicity achieves a system which is relatively inexpensive to manufacture, and which has limited possibility for component failures that require time-consuming repair or replacement.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Figure 1:
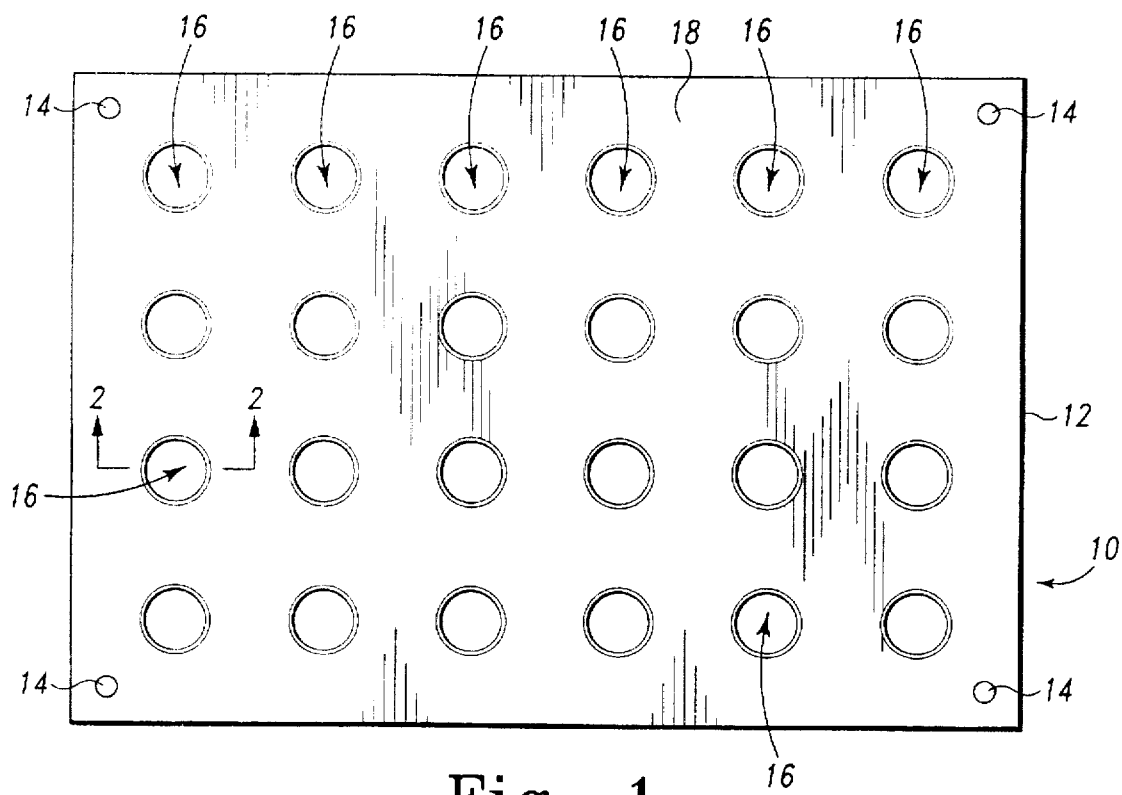
FIG. 1 is a top view of a first embodiment of a vessel holder of the present invention.

Corresponding reference characters indicate corresponding parts throughout the several views. Although the drawings represent an embodiment of the invention, the drawings are not necessarily to scale and certain features may be exaggerated or omitted in order to better illustrate and explain the present invention.

DESCRIPTION OF THE PREFERRED EMBODIMENTS

Referring now to FIG. 1, there is shown a top view of a first embodiment of a vessel holder configured according to the present invention. The vessel holder, generally designated 10, includes a rectangular, plate shaped solid body 12 having a uniform thickness or depth.

When intended to handle up to twenty-four reaction vessels of the type described further below, suitable dimensions for plate 12 are a length of 8.0 inches (20.32 cm), a width of 5.5 inches (13.97 cm), and a thickness of 0.45 inch (1.143 cm). As plate 12 may come into contact with a variety of chemicals during use, plate 12 is preferably formed of a relatively inert material, such as Teflon® brand of plastic. Other materials of construction, including metal, ceramic, plastic and wood, may alternatively be used for the plate. Proximate each of its four corners, a bore 14 which aids in vessel holder storage and alignment extends through the entire plate depth.

Extending straight through plate 12 are twenty-four openings or apertures, generally designated 16, into which up to twenty-four individual test or reaction vessels are insertable for use. The centers of adjacent apertures 16 are spaced about 1.25 inches (3.175 cm) apart. While shown arranged in a matrix having six columns and four rows, apertures 16 may be arranged in alternate patterns on plate 12 within the scope of the invention. The shown and described twenty-four apertures is highly suitable to the many scientific research practices where lots of ninety-six, or four times twenty-four, are employed. Fewer or additional apertures, such as in quantities that are multiples of twenty-four, may be utilized in alternate embodiments.

Although not shown, identifying indicia or legends for the apertures 16 may be provided along plate top surface 18 to allow a vessel holder user to conveniently keep track of the vessels held within the apertures. For example, each row of apertures can be designated with a letter of the alphabet, and each column of apertures can be designated with a number. Alternatively, a single mark or number can be placed on plate top surface 18, such as at the plate center, which allows a user to properly and consistently reorient the plate so that the user can then mentally calculate the identity of each aperture 16.

Figure 2:
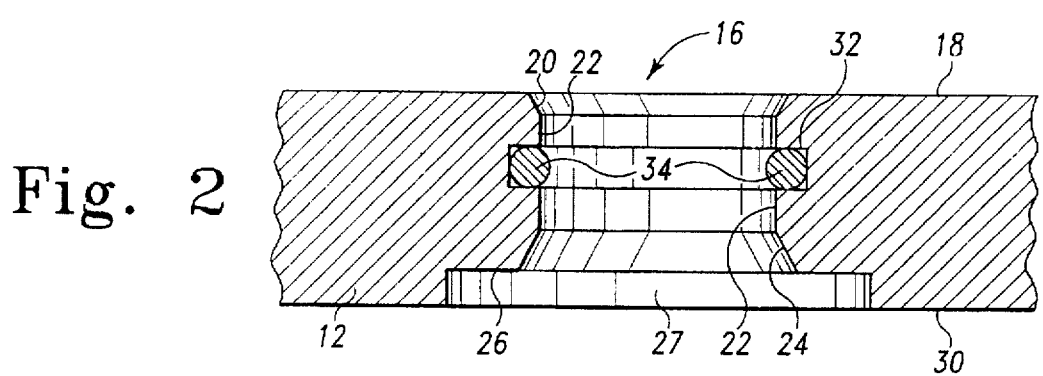
FIG. 2 is a front cross-sectional view, taken along line 2—2 of FIG. 1, illustrating a vessel engaging portion of the vessel holder.

Referring now to FIG. 2, there is shown a front cross-sectional view, taken along line 2—2 of FIG. 1, of a portion of holder 10 configured to define one of the vessel receiving apertures 16. The aperture configuration shown in FIG. 2 is representative of each of the other twenty-three apertures 16 of the shown embodiment, and therefore the following explanation applies to all of apertures 16. Starting at the top surface 18 of plate 12, aperture 16 is defined by an annular, chamfered surface portion 20, a cylindrical surface 22, an annular, chamfered surface portion 24, and a counterbored surface 26 forming a recess 27 in plate bottom surface 30. An elastomeric O-ring 34 is seated within a square groove 32 formed into plate body 12 parallel to top surface 18 and along an axial segment of cylindrical surface 22. O-ring 34 is sized such that its interior diameter is slightly smaller than the internal bore formed by cylindrical surface 22, and consequently O-ring 34 projects radially inward between cylindrical surface 22.

For use with reaction vessel 40 further shown and described with reference to FIG. 3, chamfered surface portion 20 uniformly tapers from an internal diameter of approximately 0.562 inch (1.427 cm) at its mouth region at top surface 18 to an internal diameter of approximately 0.515 inch (1.308 cm) where it merges with cylindrical surface 22. Except at the point at which O-ring 34 is installed, cylindrical surface 22 has a uniform internal diameter of approximately 0.515 inch (1.308 cm) along its axial length. O-ring 34 has an internal diameter of approximately 0.500 inch (1.27 cm). Chamfered surface portion 24 has an internal diameter which increases from a dimension of approximately 0.515 inch (1.308 cm) abutting cylindrical surface 22 to a dimension of approximately 0.59 inch (1.499 cm) where recess 27 begins. Both chamfered surface portions 20 and 24 are inclined radially outwardly at an angle of about sixty degrees from vertical, which angling allows for a more ready insertion of the reaction vessel. The top of square groove 32 is approximately 0.125 inch (0.318 cm) from top surface 18. Recess 27 has a diameter of approximately 0.893 inch (2.268 cm) and extends about 0.077 inch (0.196 cm) from bottom surface 30.

Figure 3:
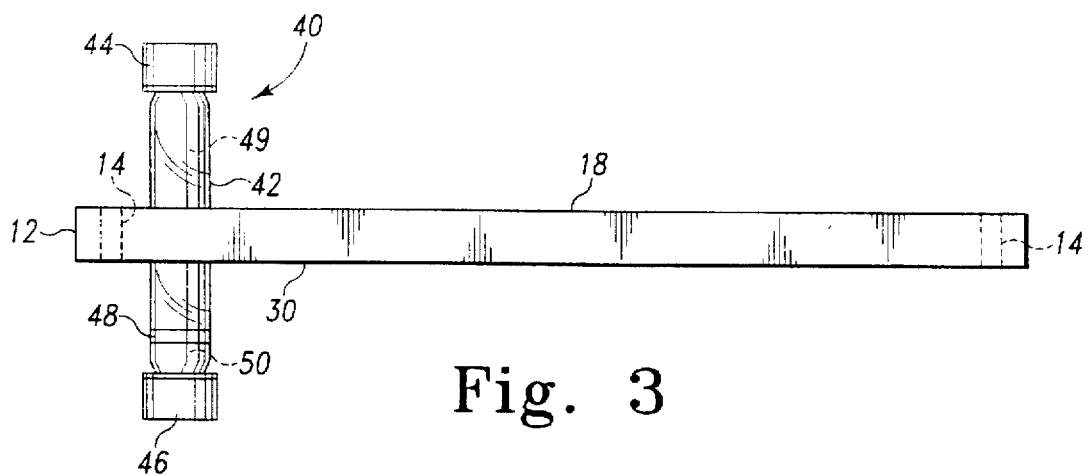
FIG. 3 is a front view of the vessel holder of FIG. 1, wherein a single test vessel is shown operationally inserted into the vessel engaging portion of FIG. 2.

Referring now to FIG. 3, there is shown a front view of vessel holder 10 after the insertion of a reaction vessel 40 into the vessel receiving aperture 16 shown in cross-section in FIG. 2. While only a single reaction vessel 40 is shown inserted in vessel holder 10 in FIG. 3, a laboratory technician or user may insert any number of reaction vessels up to twenty-four into the apertures 16 provided through plate 12. Reaction vessels of the shown type are commercially available as "micro filter funnels" from Andrews Glass Co. and Chemglass, both of Vineland, N.J. Reaction vessel 40 includes a tubular body 42 made of glass and having a generally uniform outside diameter of approximately 0.513 inch (1.303 cm) along its axial length. Proximate its open top and bottom ends, vessel body 42 tapers to reduced diameter body portions with external helical threads (not shown) onto which may be screwed internally threaded top cap 44 and bottom cap 46. The external threads on vessel 40 do not project radially beyond tubular body 42 to avoid interfering with vessel insertion into holder 10. Alternatively, the caps 44 and/or 46 may have external diameters which permit their passage through receiving apertures 16 to allow the reaction vessels to be inserted into and removed from holder 10 while the reaction vessels are in a capped state.

The interior volume of reaction vessel 40 is divided by a filter indicated at 48 into first and second chambers or compartments 49, 50. Filter 48 prevents materials of a given size from escaping from one of chambers 49, 50 to the other. Filter 48 is preferably a very fine, porous glass frit which is relatively inert so as to not react with the variety of chemicals which may be introduced into reaction vessel 40. Vessels with different porosity filters may naturally be employed in situations where materials having larger or smaller particle sizes are being contained. The open ends of tubular body 42 are sealed by caps 44, 46 to prevent loss of the substances within the vessel interior volume. When caps 44, 46 are removed, the open ends of tubular body 42 serve as ports through which materials can be poured into or drained from first compartment 49 and second compartment 50.

The term "reaction vessel" is used herein due to the instant invention's suitability for use in chemistry procedures as described more fully below. However, the invention may be used with other "types" of vessels, including test tubes if desired. In addition, the shown configuration of reaction vessel 40 is intended to be illustrative and not limiting, as a variety of differently shaped and sealable test vessels may be employed within the scope of the invention. For example, the sealing of the open top and bottom ends may be accomplished with plugs or other openable sealing members. Still further, the body of the reaction vessel need not be uniform along its axial length, but may be enlarged on one end to hold greater quantities of fluid. In particular, the tubular body could include a stepped down portion at one end which is frictionally insertable into apertures 16.

To retain a reaction vessel 40 in holder 10, either uncapped end of vessel 40 is axially inserted into an aperture 16. During insertion, the exterior periphery of reaction vessel body 42 encounters O-ring 34, which due to its sizing achieves a friction or interference fit with body 42. The friction fit can be overcome by applying sufficient insertion force such that the reaction vessel 40 can be axially inserted to the position shown in FIG. 3. When an inserter's hand is removed, the reaction vessel 40 is held within the holder 10 because the friction force between O-ring 34 and vessel body 42 is greater than the effect of gravity on even a filled reaction vessel 40.

Figure 4:
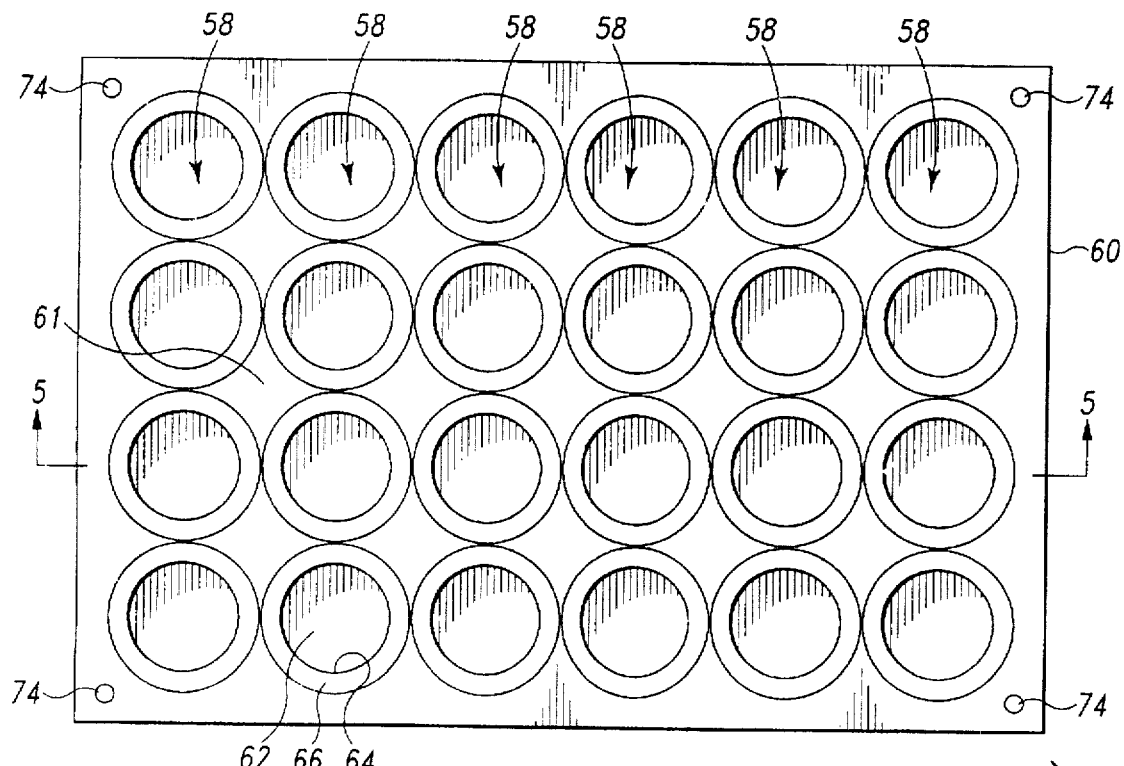
FIG. 4 is a top view of a first embodiment of a collection rack of the present invention which is adapted for use with the vessel holder of FIG. 1.
Figure 5:
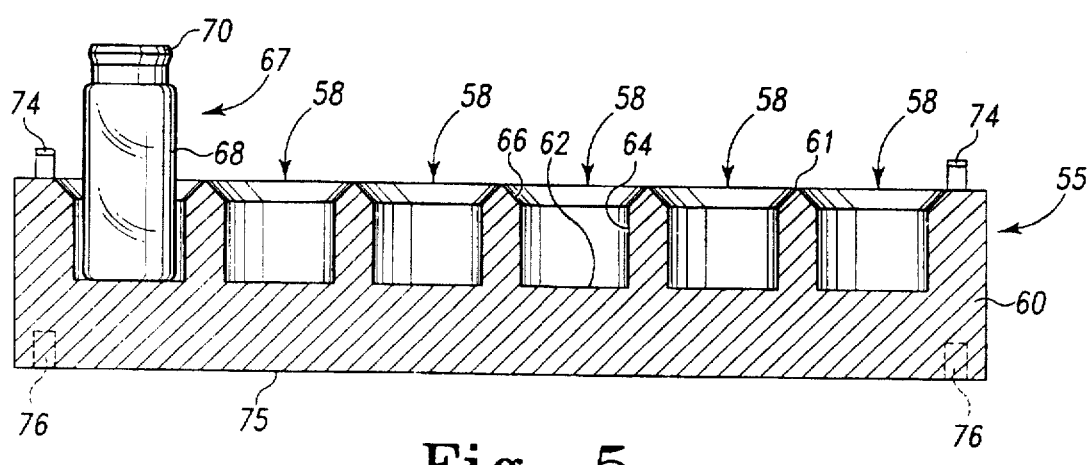
FIG. 5 is a front cross-sectional view of the collection rack, taken along line 5—5 of FIG. 4, wherein a single collection vessel is shown in front view placed in a vessel guide cavity shown in cross-section.

Referring now to FIGS. 4 and 5, there is respectively shown a top view and a cross-sectional front view of a collection or bottle rack, generally designated 55. Collection rack 55 is made of a lightweight and durable material, such as polypropylene, and constructed by forming twenty-four identical cavities 58 into a solid block or plate 60 having a length of 8.0 inches (20.32 cm), a width of 5.5 inches (13.97 cm), and a thickness of 1.45 inch (3.683 cm). As shown in FIG. 5, each cavity 58 is defined by base 62, a generally cylindrical surface 64, and a chamfered mouth portion 66. Cavities 58 are arranged in the same pattern or matrix as apertures 16 are arranged on holder plate 12. When holder 10 is aligned in stacked relationship with collection rack 55, apertures 16 are centered directly over cavities 58.

In FIG. 5, a collection vessel for which rack 55 is particularly adapted is shown in front view and operationally inserted and supported within a cavity 58. The collection vessel 67 comprises a cylindrical jar portion 68, having an outside diameter of about 0.945 inch (2.40 cm), and a reduced diameter open mouth 70. Collection vessels of this type are commercially available as 4 dram tooled neck vials from Fisher Scientific of Pittsburgh, Pa. Cavities 58 are sized complimentary to the periphery or exterior of bottles 67, and a suitable size for cylindrical surface 64 is a diameter of approximately 0.987 inch (2.507 cm) and a depth from rack top surface 61 of about 0.75 inch (1.905 cm). Chamfered mouth portions 66 are inclined at sixty degrees from vertical and extend down about 0.125 inch (0.318 cm) from top surface 61. Rather than the shown cavities or recesses, guides for maintaining the bottles in a proper alignment as described further below may be provided in other manners. For example, projecting ridges or ribs provided on the top surface of the bottle rack plate may be employed within the scope of the invention to guide the positioning of the collection bottles.

Pins or dowels 74 insert into pre-drilled blind bores provided at the four corners of plate 60 and project above top surface 61. Blind bores 76 (see FIG. 5) are provided on the underside or bottom surface 75 of bottle rack 55 directly beneath each of pins 74 for stacking purposes.

Figure 6:
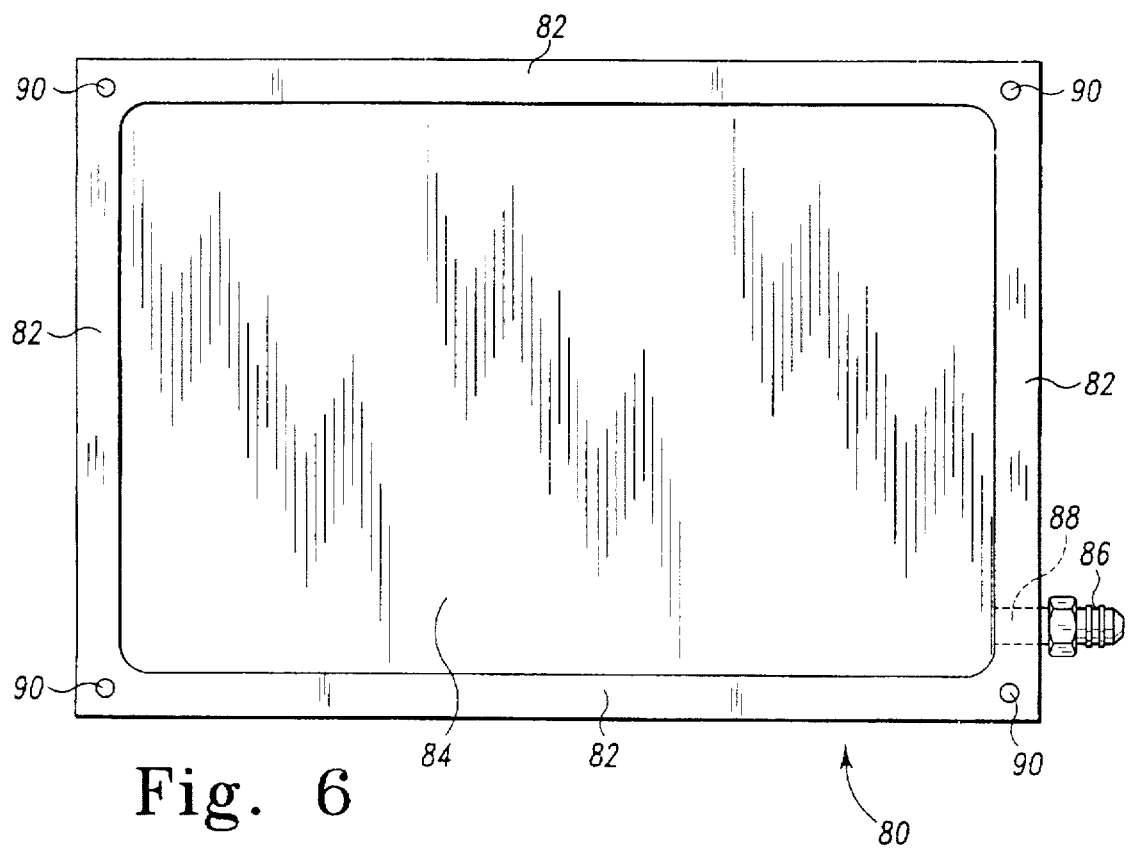
FIG. 6 is a top view of a first embodiment of a drain tray of the present invention suitable for use with the vessel holder of FIG. 1.

Referring now to FIG. 6, there is shown a top view of a drain tray, generally designated 80, of the present invention. Drain tray 80 is formed of an 8.0 inches (20.32 cm) by 5.5 inches (13.97 cm) by 1.45 inches (3.683 cm) block of polypropylene. The central portion of the top surface 82 of drain tray 80 is recessed about one inch (2.54 cm) to provide a basin 84. Basin 84 extends about 4.75 inches (12.065 cm) wide and about 7.250 inches (18.415 cm) long and consequently covers a surface area beyond that covered by the pattern of apertures 16 formed in vessel holder plate 12. Fitting 86 mounted to tray 80 ports into a drain bore 88 that opens into basin 84 for draining purposes. Similar to collection rack 55, drain tray 80 is provided with upstanding pins 90 at each corner as well as blind stacking bores (not shown) in its underside. Although not shown, a continuous gasket which rings basin 84 may be mounted along top surface 82 to permit, among other uses, a vacuum seal.

Figure 7:
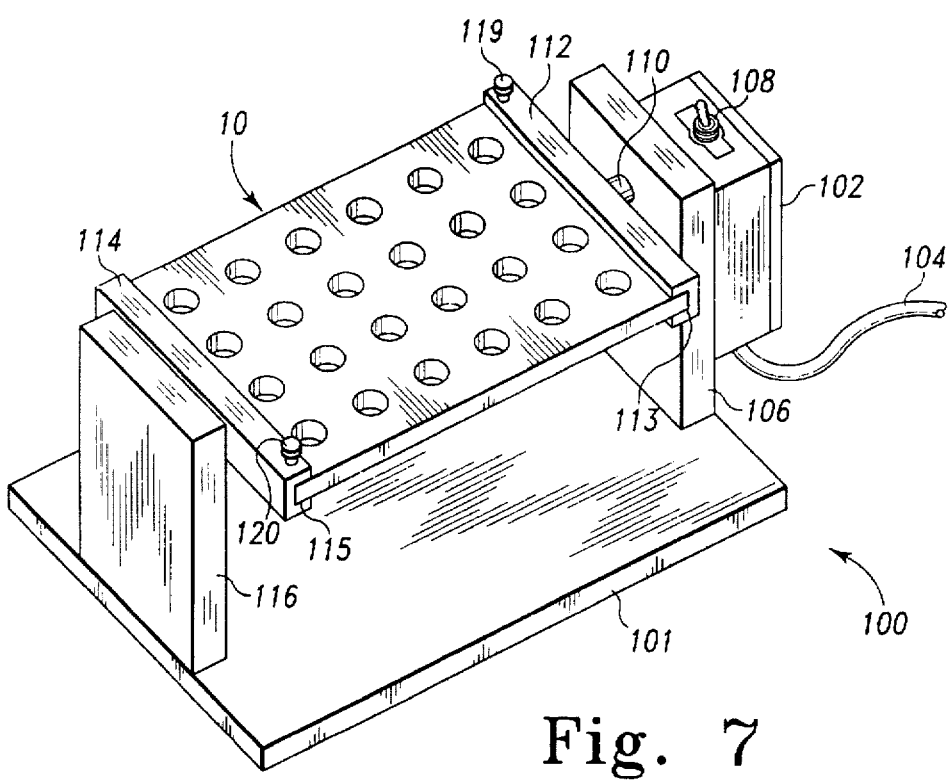
FIG. 7 is a perspective view of one embodiment of an apparatus for mixing materials within vessels retained by the vessel holder shown mounted to the apparatus.

Referring now to FIG. 7, there is diagrammatically shown a front perspective view of still another component of the vessel handling system of the present invention. A rotator or reciprocator used to achieve mixing of materials within reaction vessels is generally indicated at 100 and includes a stand base 101 made of a rigid material such as aluminum, polypropylene or other polymer, which may rest on a table or other support structure. A motor 102, connectable to an external power source via electrical cord and plug 104, is secured to upstanding stand leg 106 and includes on/off toggle switch 108. Motor output shaft 110 extends through an opening in stand leg 106 and is fixedly attached to bracket 112 made of a rigid material such as aluminum, polypropylene or other polymer. A second bracket 114, constructed of the same material as bracket 112, is freely pivotally mounted to upstanding stand leg 116. Brackets 112 and 114 include facing channels 113, 115 respectively which are sized to slidably receive plate 12. Retaining screw 119 slidably extends through a smooth bore provided in one bracket flange that defines the bracket channel 113, through channel 113, and into a tapped bore in the opposite channel-defining bracket flange. Retaining screw 120 of bracket 114 is similarly constructed and arranged. When holder 10, which is abstractly shown in FIG. 7 and without the vessels normally retained thereon, is mounted within rotator 100, retaining screws 119, 120 extend through plate bores 14 to secure holder 10 in position. When switch 108 is activated, motor 102 operates to drive the rotation of bracket 112 and causes holder 10 to be rotated about a horizontal axis extending between brackets 112 and 114. While shown rotatably mounting a single holder 10, it will be recognized that rotator 100 may be modified to retain multiple holders if desired to increase mixing capacity.

The structure of the vessel handling system of the present invention will be further understood in view of the following explanation of its operation in the performance of combinatorial chemistry. Up to twenty-four reaction vessels 40 are inserted into and retained within holder 10 in the manner described above. To facilitate further processing steps, all of the vessels 40 should be similarly oriented and inserted as shown in FIG. 3 such that the first chambers 49 all open upward when the plate top surface 18 faces upward.

With bottom caps 46 sealingly attached to all of the vessels 40, an experimental molecule attached to a resin bead is introduced into each of the first compartments 49 of the reaction vessels 40 through the uncapped vessel upper ends. The porosity of filters 48 are sufficiently small to prevent the experimental molecules/resin beads from passing into the second compartments 50. Reagents are introduced into the first compartments 49 through the still uncapped vessel upper ends. It will be recognized that different reagents can be introduced into each of the reaction vessels to provide twenty-four different syntheses, or multiple reaction vessels may be filled with the same reagent to provide multiple samples of the same synthesis.

After the top caps 44 are sealingly secured to vessels 40, holder 10 is rotated in a direction which repeatedly overturns or inverts the vessels 40 to further the reaction between the molecules/resin beads and the reagents. This holder 10 rotation may be performed manually, or may be performed by employing rotator 100 as described above.

In order to empty the reagents and the by-products from vessels 40 held by holder 10, holder 10 is first positioned such that holder plate bottom surface 30 faces upward. It will be recognized that because at this point the vessels and holder are inverted from the orientation shown in FIG. 3, bottom caps 46 are actually at the uppermost portion of vessels 40. After bottom caps 46 are all unscrewed, drain tray 80 is inverted and stacked onto holder 10 such that all four drain tray pins 90 insert into holder bores 14, and the uncapped ends of the vessels extend into drain basin 84. The stacked holder/drain tray are then inverted and set down such that holder 10 is positioned on top of drain tray 80. After top caps 44 are all subsequently unscrewed, gravity tends to drain the reagents and by-products past filters 48, through second compartments 50 and out into drain basin 84. Fluid in basin 84 empties through drain bore 88 and fitting 86, which may be connected to a receptacle for disposing of or recycling the reagents and by-products.

It will be recognized that if only some of the vessels 40 are required to be drained, only the bottom caps 46 of those particular vessels would be unscrewed and removed before stacking of drain tray 80 and inversion of the stacked holder/drain tray. The caps of the other vessels not to be drained would be left on during this draining process. To expedite draining, a vacuum may be attached to fitting 86 to draw the reagents from the vessels. When such a vacuum is employed, drain tray 80 preferably includes the above described gasket to seal with holder plate bottom surface 30.

After the draining step is completed, and while being careful to prevent dumping resin beads from first compartments 49, holder 10 is lifted off drain tray 80 and bottom caps 46 are screwed onto vessels 40. If desired, additional rounds of reagents then may be added to vessels 40, reacted, and drained therefrom in the same manner as described above. When the complete synthesis of the molecules attached to the resins beads has been performed, the synthesized molecules are then collected in the following manner.

While bottom caps 46 are attached and top caps 44 are removed, a solvent and/or reagent cleaving the synthesized molecule from the polymer bead is introduced into first compartments 49. The synthesized molecules, but not the beads, are soluble in the solvent. As a result, the synthesized molecules are now released into the solution. After the top caps 44 are reattached to vessels 40, the holder 10 is repeatedly inverted as appropriate, and by rotator 100 if desired, to ensure the molecules are placed into solution. Then, holder 10 is positioned such that holder plate bottom surface 30 faces upward, and bottom caps 46 are removed. Twenty-four collection vessels 67 are then placed over the vessels such that the collection vessel mouth portions 70 are seated within plate surface recesses 27 and the upwardly extending reaction vessel ends project into the interior volumes of the collection vessels 67. Recesses 27 aid in locating collection vessels 67 to limit contact with reaction vessels 40.

Collection rack 55 is then inverted and placed into stacked relationship with holder 10 such that each of the twenty-four collection vessels 67 fits into a rack cavity 58. Then, while being held together, the stacked holder 10 and collection rack 55 are inverted and set down. After top caps 44 are removed, the synthesized molecules in solution drain into collection vessels 67. Collection vessels 67 are preferably sufficiently tall, and/or prior to being emptied the reaction vessels 40 are manipulated to project a limited distance above plate bottom surface 30, such that vessels 40 are not immersed in the solutions which are collected in collection vessels 67 so as to reduce the possibility of contamination of the solutions. After the reaction vessels 40 are emptied, holder 10 and the retained reaction vessels 40 may be lifted to allow further characterization, distribution or storage of the solutions contained in the collection vessels 67. Holder 10 and reaction vessels 40 may then be cleaned for reuse. If a user has no further need for the inventive system, after removal of vessels 67 and reaction vessels 40, holder 10 may be stacked on collection rack 55 such that pins 74 insert into plate bores 14, and collection rack 55 may be stacked on drain tray 80 such that tray pins 90 insert into rack bores 76, to achieve an orderly and convenient storage.

In an alternate inventive configuration which is not shown, vessel holder 10 is replaced with two separate plates made of plastic or Teflon®. Each of these plates includes openings arranged in the same matrix as the apertures are arranged in the holder of FIG. 1. The plates may be releasably secured together in a stacked relationship and with their openings aligned by way of multiple bolts extending downward through the thickness of the top plate and into engagement with nuts mounted within recesses formed in the bottom surface of the bottom plate. For use with this vessel holder, each reaction vessel is equipped with a radially extending locking ring or projection at a middle portion of its tubular body. Suitable locking rings may be furnished by forcing tight-fitting O-rings onto the reaction vessels, or the reaction vessel bodies may be integrally formed with such projections. In this alternate embodiment, the openings in the separate holder plates are larger than the reaction vessel body diameter, but are smaller than the vessel locking rings. To use these complementarily designed vessels and holder, while the plates are separated, the top ends of the reaction vessels are inserted from below through the openings of the top plate, and the bottom ends of the reaction vessels are inserted from above through the openings of the bottom plate. When the plates are subsequently brought together and then secured with the nuts and bolts, the locking rings on the vessels are effectively sandwiched between the top and bottom plates to retain the vessels in the holder during use.

Another not shown aspect of the invention is a vessel handling system having heating and cooling means. Heating and cooling may be accomplished, for example, in one or more of the following ways: by placing the vessel handling system in a hot or cold environment; by providing heat exchange means such as metal or electrical resistance coils within the vessel handling system, and in particular in the vessel holder body between the rows and columns of apertures 16; and by introducing hot or cold fluids (e.g., gases or liquids) through one or more conduits in the vessel handling system, such as in the vessel holder body or in the drain tray into which the holder with capped vessels may be placed.

The system of the invention has been used to prepare twenty-four different amides starting with four different resin bound amines and six different carboxylic acids.

While this invention has been shown and described as having multiple designs, the present invention may be further modified within the spirit and scope of this disclosure. For example, rather than using a friction fit to retain vessels within the vessel holder, other forms of vessel securement, including the use of magnetic forces between the holder and the vessels, alternatively may be employed. This application is therefore intended to cover any variations, uses, or adaptations of the invention using its general principles. Further, this application is intended to cover such departures from the present disclosure as come within known or customary practice in the art to which this invention pertains.

What is claimed is:

1. A vessel handling system comprising:

a vessel holder comprising a body through which extend a plurality of apertures, said plurality of apertures located on said body in a first arrangement;

a plurality of vessels including a first vessel and a second vessel, each of said plurality of vessels comprising an interior volume and a filter dividing said interior volume into a first chamber and a second chamber, each of said plurality of vessels further comprising a first port in communication with said first chamber, a second port in communication with said second chamber, a first stop member for selectively sealing and unsealing said first port, and a second stop member for selectively sealing and unsealing said second port;

said vessel holder and said plurality of vessels cooperatively configured such that said vessel holder holds each of said plurality of vessels inserted into one of said plurality of body apertures, wherein said vessel holder comprises a plurality of O-rings, one of said O-rings installed in a body groove located along an axial length of each of said apertures, each of said O-rings having an inside diameter sized to frictionally engage a periphery surface of one of said vessels, whereby each of said plurality of vessels is separately removable from said vessel holder without removing the other vessels;

said first stop member of said first vessel separately operable from said first stop member of said second vessel, whereby said first vessel first port may by sealed and unsealed while said second vessel first port remains unsealed and sealed respectively; and said second stop member of said first vessel separately operable from said second stop member of said second vessel, whereby said first vessel second port may by sealed and unsealed while said second vessel second port remains unsealed and sealed respectively.

2. The vessel handling system of claim 1 wherein each of said plurality of vessels comprises a first threaded end, and wherein each said first stop member comprises a sealing screw cap securable onto said first threaded end.

3. The vessel handling system of claim 1 wherein said plurality of vessels comprises at least six vessels, and wherein said first and second stop members of each vessel are respectively separately operable from the first and second stop members of all the other vessels.

4. The vessel handling system of claim 1 wherein said vessel holder body comprises a bottom surface with a plurality of recesses, one of said plurality of recesses ringing each of said plurality of apertures, each of said recesses adapted to insertably receive an open end of a collection vessel.

5. The vessel handling system of claim 1 further comprising a collection rack comprising a plurality of vessel guides, each of said vessel guides adapted to accommodate a collection vessel, said plurality of vessel guides arranged in said first arrangement, whereby said plurality of vessel guides are aligned with said plurality of apertures when said collection rack and said vessel holder are positioned in a stacked relationship.

6. The vessel handling system of claim 1 further comprising a drain tray, said drain tray comprising a plate with a cavity formed in a top surface, said cavity covering an area of said plate top surface at least as large as an area of said holder body covered by said first arrangement of said plurality of apertures.

7. The vessel handling system of claim 1 further comprising a vessel rotator, said vessel rotator comprising:
   a stand;
   a bracket into which said vessel holder is removably installable; and
   a motor mounted to said stand and comprising a rotatable output shaft operatively linked to said bracket, whereby operation of said motor rotates said bracket to rotate an installed vessel holder.

8. The vessel handling system of claim 1 wherein said plurality of apertures form a matrix comprising multiple rows and columns.

9. A vessel handling system comprising:
   at least two vessels, each of said at least two vessels comprising an interior volume and a filter dividing said interior volume into a first chamber and a second chamber, each of said at least two vessels further comprising a first closable port in communication with said first chamber and a second closable port in communication with said second chamber;
   a holder comprising a body through which extend a plurality of apertures, said plurality of apertures located on said body in a first arrangement;
   wherein said holder and said at least two vessels are complementarily sized and shaped such that said holder holds each of said at least two vessels inserted into one of said plurality of body apertures;
   at least two collection containers;
   a collection rack comprising a plurality of container guides, each of said container guides adapted to accommodate one of said at least two collection containers, said plurality of container guides arranged in said first arrangement, whereby said plurality of container guides are aligned with said plurality of apertures when said collection rack and said holder are positioned in a first stacked relationship; and
   wherein said holder body comprises a surface with a plurality of recesses, said surface arranged in direct facing relationship with said collection rack when said holder and said collection rack are positioned in said first stacked relationship, wherein one of said plurality of recesses rings each of said plurality of apertures and is sized and shaped to accommodate a mouth of one of said at least two collection containers.

10. The vessel handling system of claim 9 wherein said collection rack comprises a plate and said plurality of container guides comprises a plurality of hollows formed in said plate.

11. The vessel handling system of claim 9 wherein said holder comprises one of a plurality of alignment pins and a plurality of alignment bores and said collection rack comprises the other of said plurality of alignment pins and said plurality of alignment bores, said alignment pins aligned to insert into said alignment bores when said collection rack and said holder are positioned in said first stacked relationship.

12. The vessel handling system of claim 9 wherein said first arrangement comprises a matrix, whereby said plurality of apertures are arranged in multiple rows and columns.

13. The vessel handling system of claim 9 further comprising a drain tray, said drain tray comprising a plate with a cavity formed in a top surface, said cavity covering an area of said plate top surface at least as large as an area of said holder body covered by said first arrangement of said plurality of apertures, and wherein said drain tray further comprises a drain porting into said plate cavity.

14. The vessel handling system of claim 9 wherein a portion of said holder defining each of said plurality of apertures is sized to frictionally engage the periphery of one of said at least two vessels, whereby said frictionally engaged vessel is removably retained within said holder.

15. The vessel handling system of claim 14 wherein said holder portion defining each of said plurality of apertures comprises a resilient O-ring having an internal diameter sized to frictionally engage the periphery of one of said at least two vessels.

16. A vessel handling system comprising:
   a plurality of vessels each comprising an interior volume and a filter dividing said interior volume into a first chamber and a second chamber, each of said plurality of vessels further comprising a first port in communication with said first chamber and a second port in communication with said second chamber;
   means for removably holding said plurality of vessels, said holding means comprising a plurality of apertures in a first arrangement;
   means for selectively sealing said first and second ports of said plurality of vessels such that after all of said first and second ports of said plurality of vessels held by said holding means are sealed, one of said plurality of vessels may be removed from said holding means while the first and second ports of the other vessel held by said holding means remained sealed;
   a collection rack comprising a plurality of vessel guides, each of said vessel guides adapted to accommodate a collection vessel, said plurality of vessel guides arranged in said first arrangement, whereby said plurality of vessel guides are aligned with said plurality of apertures when said collection rack and said holding means are positioned in a stacked relationship; and
   a drain tray comprising a plate with a cavity formed in a top surface, said cavity covering an area of said plate top surface at least as large as an area of said holding means covered by said first arrangement of said plurality of apertures.

17. The vessel handling system of claim 16 further comprising means for rotating said holding means, said rotating means comprising a holding means mount and a motor operatively connected to said holding means mount.

18. The vessel handling system of claim 17 wherein said holding means mount comprises a bracket having a channel into which said holding means slidably inserts.

19. A vessel handling system comprising:
   a vessel holder comprising a body through which extend a plurality of apertures, said plurality of apertures located on said body in a first arrangement;
   a plurality of vessels including a first vessel and a second vessel, each of said plurality of vessels comprising an interior volume and a filter dividing said interior volume into a first chamber and a second chamber, each of said plurality of vessels further comprising a first port in communication with said first chamber, a second port in communication with said second chamber, a first stop member for selectively sealing and unsealing said first port, and a second stop member for selectively sealing and unsealing said second port;
   said vessel holder and said plurality of vessels cooperatively configured such that said vessel holder holds each of said plurality of vessels inserted into one of said plurality of body apertures;
   said first stop member of said first vessel separately operable from said first stop member of said second vessel, whereby said first vessel first port may by sealed and unsealed while said second vessel first port remains unsealed and sealed respectively;

said second stop member of said first vessel separately operable from said second stop member of said second vessel, whereby said first vessel second port may by sealed and unsealed while said second vessel second port remains unsealed and sealed respectively; and a vessel rotator, said vessel rotator comprising: a stand; a bracket into which said vessel holder is removably installable; and a motor mounted to said stand and comprising a rotatable output shaft operatively linked to said bracket, whereby operation of said motor rotates said bracket to rotate an installed vessel holder.

* * * * *

UNITED STATES PATENT AND TRADEMARK OFFICE
CERTIFICATE OF CORRECTION

PATENT NO. : 5,785,927
DATED : July 28, 1998
INVENTOR(S) : William L. Scott, et al.

It is certified that error appears in the above-indentified patent and that said Letters Patent is hereby corrected as shown below:

Claim 16, column 12, line 26, after "other", delete "vessel" and insert --vessels--.

Signed and Sealed this

Twenty-ninth Day of December, 1998

*Attest:*

BRUCE LEHMAN

*Attesting Officer*     *Commissioner of Patents and Trademarks*